(12) United States Patent (10) Patent No.: US 6,853,569 B2
Cheng et al. (45) Date of Patent: Feb. 8, 2005

(54) DC TO DC CONVERTER

(75) Inventors: Ka Wai Eric Cheng, Kowloon (HK); Yiu Pun Benny Yeung, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 51 days.

(21) Appl. No.: 10/346,167

(22) Filed: Jan. 17, 2003

(65) Prior Publication Data

US 2004/0141345 A1 Jul. 22, 2004

(51) Int. Cl.[7] .............................................. H02M 5/42
(52) U.S. Cl. ......................... 363/97; 363/17; 363/132
(58) Field of Search .............................. 363/16, 17, 19, 363/97, 98, 132, 127, 131

(56) References Cited

U.S. PATENT DOCUMENTS 4,855,888 A * 8/1989 Henze et al. ................. 363/17
5,157,593 A * 10/1992 Jain ............................. 363/17
6,369,745 B1   4/2002 Lee et al.

OTHER PUBLICATIONS

K.W.E. Cheng, "Zero–current–switching Switching–capacitor Converters", IEE Proceedings–Electr. Power Appl., vol. 148, Sep. 2001, No. 5, pp. 403–409, no date.
H.S.H. Chung et al., "Development of a Switched–capacitor DC–DC Converter with Bidirectional Power Flow", IEEE Trans., Circuits and System I: Fundamental Theory and Appl., vol. 47, Sep. 2000, No. 9, pp. 1383–1389, no date.
Guichao Hua et al., Soft–Switching Techniques in PWM Converters, IEEE Transactions on Industrial Electronics, vol. 42, 1995, No. 6, pp. 595–603, no date.

* cited by examiner

Primary Examiner—Rajnikant B. Patel
(74) Attorney, Agent, or Firm—Leydig, Voit & Mayer, Ltd.

(57) ABSTRACT

A DC to DC converter includes a switch, a diode, and a capacitor connected in series with an inductor. The capacitor and inductor provide a resonant time period and are connected in series with the switch and the diode. A control circuit provides an on/off signal to the switch and has a switching time period longer than half the resonant time period.

15 Claims, 6 Drawing Sheets

DC TO DC CONVERTER

BACKGROUND TO THE INVENTION

1. Field of the Invention

The invention relates to Direct Current (DC) power supplies, and in particular to DC to DC converters.

2. Background Information

Very large scale integration (VLSI) has resulted in the power consumption of integrated circuits increasing substantially. At the same time size and weight are vital considerations and thus it is desirable to increase the output of DC power supplies without increasing their size and weight. Operating power supplies at high switching frequencies allows the relative size of passive components such as inductors and capacitors to be reduced. However, high frequency switching of high converter currents can cause Electromagnetic Interference (EMI).

Switched-capacitor converters have been developed for fabrication in integrated circuits. This type of converter has no magnetic component for filtering so its size and weight are reduced. Energy is stored in the switched-capacitor. However, it has a problem with current spikes when charging the switched-capacitor. Electromagnetic interference (EMI) is produced by the current spikes.

When a semiconductor device such as a metal oxide semiconductor field effect translator (MOSFET) or Insulated gate bipolar transistor (IGBT) turns on or off in the presence of a current flow power ($I^2R$) is consumed. This results in heating of the device and reduced efficiency. In a high frequency high power converter this heating and switching loss can become significant.

SUMMARY OF THE INVENTION

It is an object of the present invention to provide a DC to DC converter that overcomes or at least ameliorates the above problems.

It is another object of the present invention to provide a DC to DC converter in which the switching devices turn on and off under low or zero current conditions.

A further object of the present invention is to tender bi-directional power flow of DC to DC converters that gives double or halved voltage or inverted voltage according to the power flow direction of the circuits.

According to a first aspect of the invention there is provided a DC to DC converter including:
  a switch,
  a diode,
  a capacitor in series with an inductor, the capacitor and inductor having a resonant time period and connected in series with the switch and the diode, and
  a control circuit for providing on/off signals to the switch and having a switching time period of longer than half the resonant time period.

According to a second aspect of the invention there is provided a DC to DC converter including:
  a first positive node having a first voltage,
  a second positive node having a second voltage,
  a common node,
  a first switch in series with a second switch, the first and second switches connected between the first positive node and the common node,
  a third switch in series with a fourth switch, the third and forth switches connected between the first positive node and the second positive node,
  diodes provided across the switches,
  a capacitor in series with an inductor, the capacitor and inductor having a resonant time period and connected across the first and third switches,
  a control circuit for providing on/off signals to the switches and having a switching time period longer than half the resonant time period.

Preferably the converter includes a first filter capacitor connected between the first positive node and the common node, and a second filter capacitor connected between the second positive node and the common node.

Preferably the inductor is a coil with an air core.

Preferably the second voltage is substantially double the first voltage.

Preferably the control circuit provides the on/off signals to the first switch and second switch for current flow in a first direction, or provides the on/off signals to the third switch and forth switch for current flow in a second direction.

Preferably the diodes are integral with the switches.

Preferably the switches are power semiconductor switches.

Preferably the switches are metal oxide semiconductor field effect transistors (MOSFETs) or insulated gate bipolar transistors (IGBTs).

According to a third aspect of the invention there is provided a DC to DC converter including:
  a first positive voltage node,
  a second positive voltage node,
  a common voltage node,
  a first filter capacitor connected between the first positive voltage node and the common voltage node,
  a second filter capacitor connected between the second positive voltage node and the common voltage node,
  four switches provided with diodes across their terminals, the first and second switches in series and connected between the first positive voltage node and the common voltage node, the third and forth switches in series and connected between the first positive voltage node and the second positive voltage node, and
  a capacitor and an inductor in series and connected across the first and third switches.

According to a forth aspect of the invention there is provided a DC to DC converter including:
  a first node having a first voltage value,
  a second node having a second voltage value,
  a third node,
  a first switch in series with a second switch, the first and second switches connected between the first node and the third node,
  a third switch in series with a fourth switch, the third and forth switches connected between the first node and the second node,
  diodes provided across the switches,
  an energy storage means connected across the first and third switches,
  means for providing operating signals to the first and second switches for current flow in a first direction, or providing operating signals to the third and forth switches for current flow in a second direction.

According to a fifth aspect of the invention there is provided a DC to DC converter including:
  a first node,
  a second node coupled to the first node,
  a third node, a first switch in series with a second switch, the first and second switches connected between the first and third nodes, a third switch in series with a fourth switch, the third and fourth switches connected between the third and second nodes, diodes provided across the switches, a capacitor series with an inductor, the capacitor and inductor having a resonant time period and connected across the second and forth switches, and a controller for providing on and off signals to the switches and having a switching time period longer than half the resonant time period.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
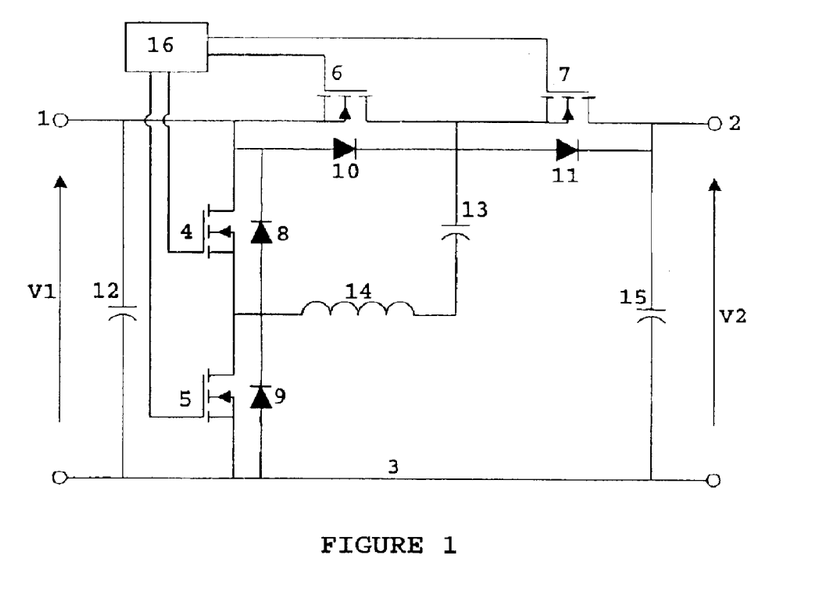
FIG. 1 is a circuit diagram for a first embodiment of a DC to DC converter according to the invention.

Referring to FIG. 1, a first embodiment of a DC to DC converter according to the invention has a low voltage side V1 between a first voltage node 1 and a common ground or negative line 3, and a second voltage side V2 between a second voltage node 2 and the common ground or negative line 3. The ground or negative line 3 may be at any potential lower than the voltage nodes 1, 2. Two filter capacitors 12, 15 are connected across the first and second voltage sides V1, V2 respectively.

The converter has four metal oxide semiconductor field effect transistor (MOSFET) switches 4, 5, 6, 7. In other embodiments insulated gate bipolar transistors (IGBTs) and other suitable semiconductor switches are used. Each MOSFET is provided with a diode 8, 9, 10, 11 connected between its Source and Drain. In the preferred embodiment the diodes are anti-parallel diodes incorporated as part of the MOSFET package. The first and second MOSFETs 4, 5 are in series and connected between the first voltage node 1 and the common line 3. The third and forth MOSFETs 6, 7 are in series and connected between the first and second voltage nodes 1, 2.

A series resonant capacitor 13 and an inductor 14 are connected across the first and third MOSFETs 4, 6. The capacitor 13 provides the main energy storage component in the converter. The inductor 14 does not have a magnetic component for filtering. It is a very small air-core inductor used for obtaining resonance with the capacitor 13.

Figure 5:
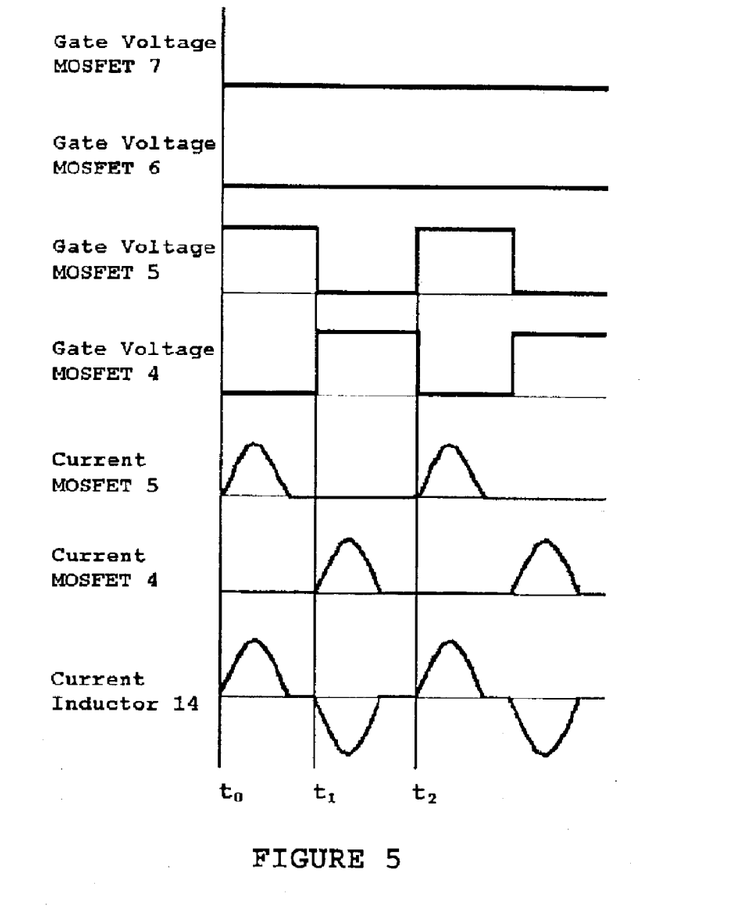
FIG. 5 illustrates gate and current waveforms for the first mode of operation of the circuit of FIG. 1, FIGS. 6 and 7 illustrate operating stages for a second mode of operation of the circuit of FIG. 1.
Figure 8:
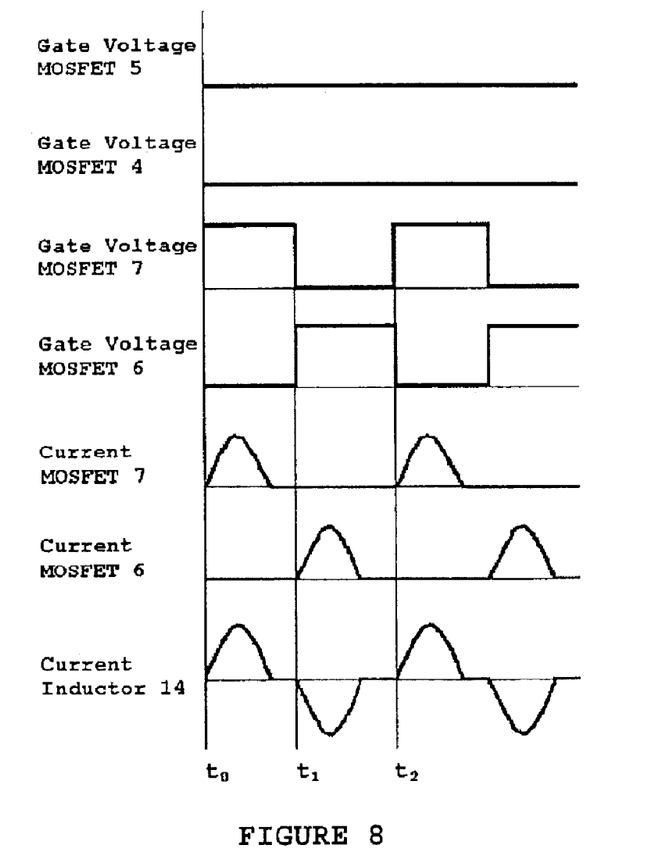
FIG. 8 illustrates gate and current waveforms for the second mode of operation of the circuit of FIG. 1, FIGS. 9 and 10 show observed gate and current waveforms for the first mode of operation of the circuit of FIG. 1.

A gate drive control circuit 16 provides on/off Gate signals to the MOSFETs. The gate drive 16 provides 15-volts between the Gate and Source to turn on a MOSFET and zero volts or preferably a slightly negative voltage to turn off a MOSFET. FIGS. 5 and 8 and the later discussions illustrate the state and thus voltage level required for each MOSFET during the operation of the converter. The gate driver 16 may be an integrated circuit or a high-speed transistor to provide the necessary Gate Source voltage.

The DC to DC converter is bi-directional. In a first step-up mode voltage V1 is the input side and voltage V2 is on the load side. The first and second MOSFETs 4, 5 are switched to obtain power flow in this first direction. In the second step-down mode voltage V2 is the input side and Voltage V1 is on the load side. The third and forth MOSFETs 6, 7 are used to obtain power flow in this second direction. If there are substantially no loss in the circuit voltage V2 is equal to two times voltage V1 (i.e. V2=2×V1).

The converter works by charging and discharging the capacitor 13. Capacitor 13 also acts as a resonant capacitor for resonating with inductor 14 to obtain a zero-current switching condition for the MOSFETs. When a first MOSFET is turned on a first diode is forward biased and turns on and current flows through a series path comprising the MOSFET, switched capacitor 13, inductor 14 and the diode. Initially the current in an inductor is always zero, therefore at turn on current in the series path is zero. Due to the series capacitor 13 and inductor 14 the current in the series path is sinusoidal with a period (time for one cycle) of:

$$2.\pi.\sqrt{L.C}$$

were L is the inductance of inductor 14 and C is the capacitance of capacitor 13. Assuming positive current flow first, at the end of the first half cycle (½ a period) the diode is reverse biased preventing current flow in the negative half cycle. A zero current condition exists and the MOSFET is turned off. The second MOSFET is turned on and a second diode is forward biased. The current is initially zero and the negative half cycle of resonant current flows. At the end of the negative half cycle the second diode is reverse biased and a zero current situation exists. By having a switching time for the MOSFETs of longer than one half cycle (half a period) of the LC resonant current zero current switching is achieved.

Because the switched-capacitor 13 is charged and discharged by the resonate sinusoidal current the circuit does not have current spike problem.

Figure 3:
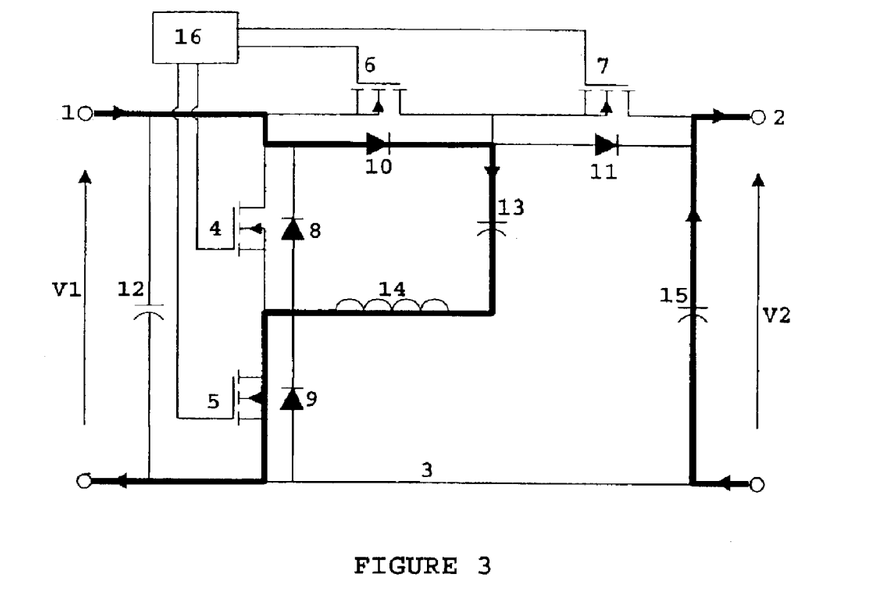
FIGS. 3 and 4 illustrate operating stages for a first mode of operation of the circuit of FIG. 1.
Figure 4:
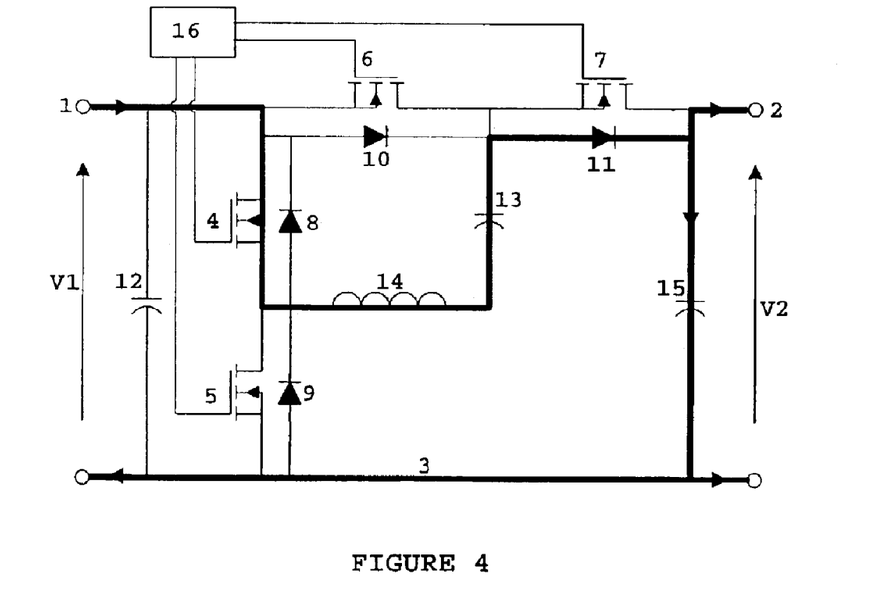

FIGS. 3 and 4 show the two stages of one cycle of step-up mode of operation. Current paths are shown in bold. FIG. 5 shows MOSFET gate and current waveforms. The third and forth MOSFETs 6, 7 remain off.

Referring to FIGS. 3 and 5, at time to second MOSFET 5 is switched on and first MOSFET 4 is switched off. Diode 10 is forward biased. Filter capacitor 15 discharges to the load connected at voltage node 2. MOSFET 5 and diode 10 are in series with capacitor 13 and inductor 14. Switched capacitor 13 resonates with inductor 14 resulting in a sinusoid current through the series path. At the end of the first resonant half cycle the series current (inductor 14 current) passes zero and diode 10 is reverse biased preventing current flow in the negative half cycle. The capacitor is charged to a DC voltage equal to V1.

Referring to FIGS. 4 and 5, at time t1 diode 10 is reverse biased and the current is zero. First MOSFET 4 is switched on and second MOSFET 5 is switched off. Diode 11 is forward biased. First voltage V1 and switched capacitor 13 are in series and ideally voltage V2 is equal to twice voltage V1. The negative half cycle of the resonant current flows. Filter capacitor 15 is recharged. At the end of the negative half cycle diode 11 is reverse biased and current flow stops. At time t2 second MOSFET 5 is switched on again and first MOSFET 4 is switched off.

Figure 6:
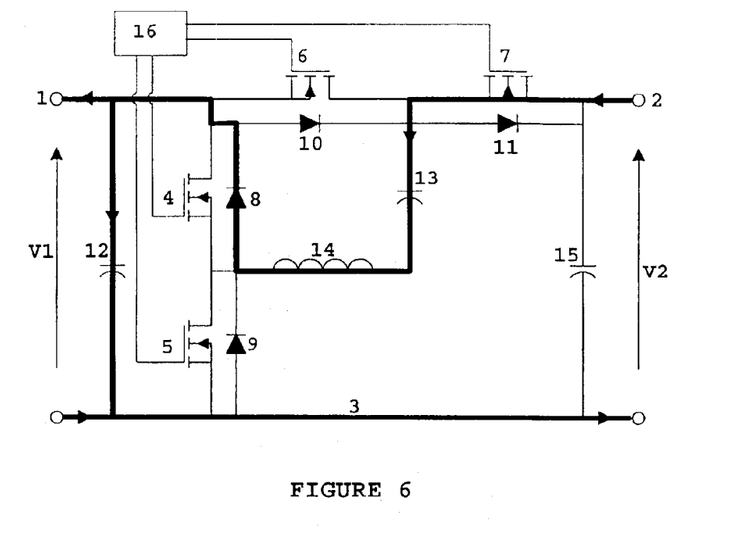
Figure 7:
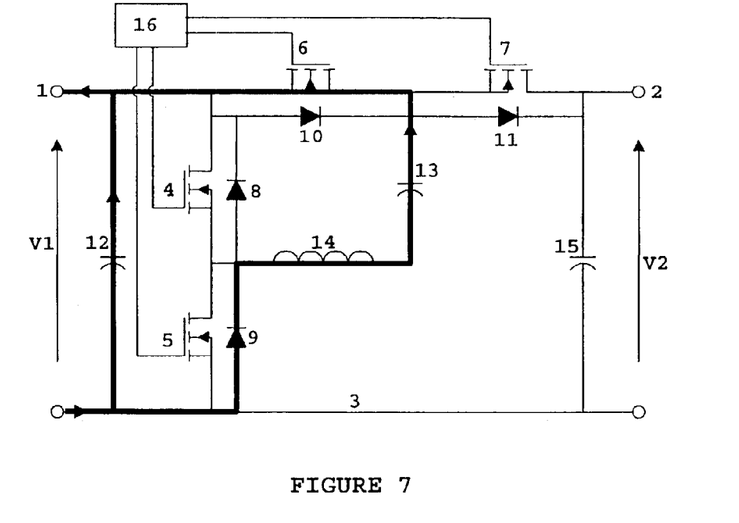

FIGS. 6 and 7 show the two stages of one cycle of operation in Step-down mode. Current paths are shown in bold. FIG. 8 shows MOSFET gate and current waveforms. The first and second MOSFETs 4, 5 remain off. Resonant waveforms are similar to that of step-up mode shown in FIG. 5. All switches are in zero-current switching condition.

Referring to FIGS. 6 and 8, at time t0 forth MOSFET 7 is switched on and third MOSFET 6 is switched off. Diode 8 is forward biased. Sinusoidal current flows through switched capacitor 13 and inductor 14. At the end of the half cycle diode 8 is reverse biased and current flow stops. Filter capacitor 12 and switched capacitor 13 are charged in series from input voltage V2. When charged, filter capacitor 12 and switched capacitor 13 each to have a DC voltage component equal to half of voltage V2 (i.e. 0.5×V2).

Referring to FIGS. 7 and 8, at time t1 diode 8 is reverse biased and the current zero. The third MOSFET 6 is switched on and forth MOSFET 7 is switched off. Diode 9 is forward biased. Sinusoidal current flows through switched capacitor 13 and inductor 14. At the end of the half cycle diode 9 is reverse biased and current flow stops. Filter capacitor 12 and switched capacitor 13 discharge in parallel to the load connected to voltage V1. Ideally, voltage V1 is equal to half voltage V2 (i.e. V1=0.5×V2).

Specification and component values for a converter according to the invention are:

| Rated Power | 50 Watts |
| Switching Frequency | 125 kHz |
| Rated first voltage V1 | 35 V |
| Rated second voltage V2 | 70 V |
| Switched-capacitor 13 | 0.5 µF |
| Resonant Inductor 14 | 1 µH |
| Filter capacitor 12 | 47 µF |
| Filter capacitor 15 | 47 µF |

Figure 9:
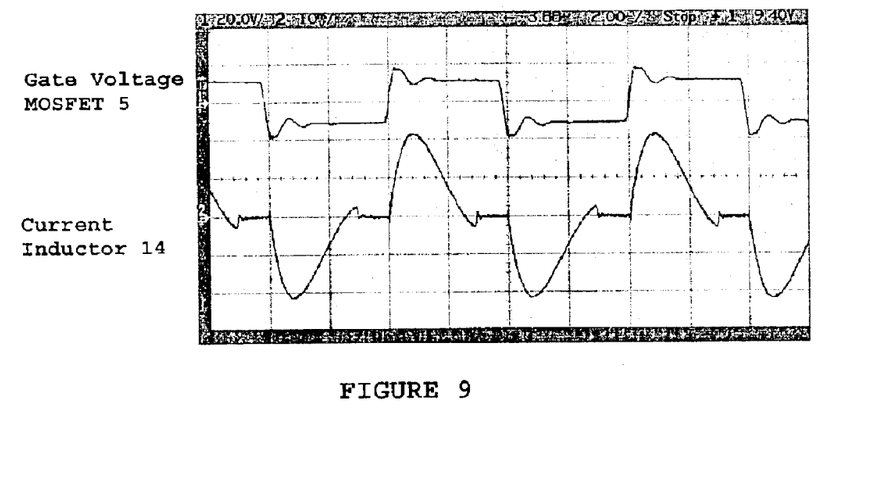
Figure 10:
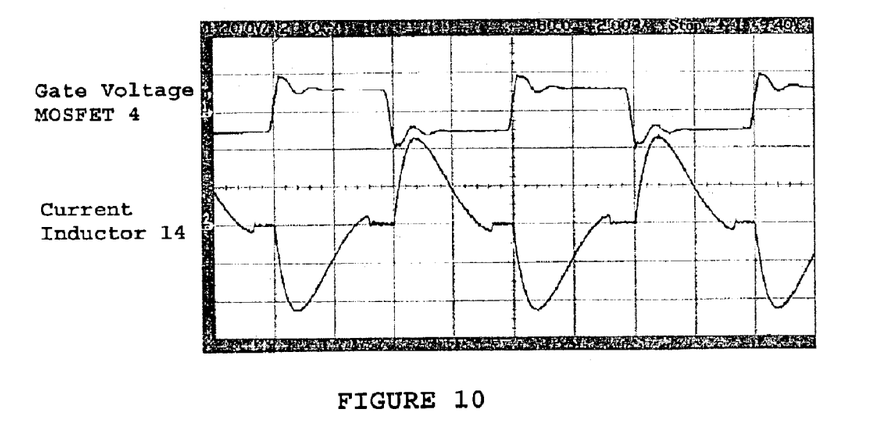

FIGS. 9 and 10 illustrate observed waveforms from a DC to DC converter circuit with the above specification and component values operating in step-up mode. First (input) voltage V1 was measured at 35V and second (output) voltage V2 was measured at 58.7V. Efficiency at rated power was 81%. The plots of FIGS. 9 and 10 have a horizontal resolution of 2 µ-seconds per division. At a switching frequency of 125 kHz the switching time for each MOSFET is 4 µ-seconds. The resonant time of the Capacitor 13 and inductor 14 is about 6 µ-seconds. Thus, half the resonant time period is about 3 µ-seconds.

In the step-down mode operation, and second (input) voltage is V2 was measured at 70V and the first (output) voltage V1 was measured at 30.4V. Efficiency in at rated power was 83%.

Figure 2:
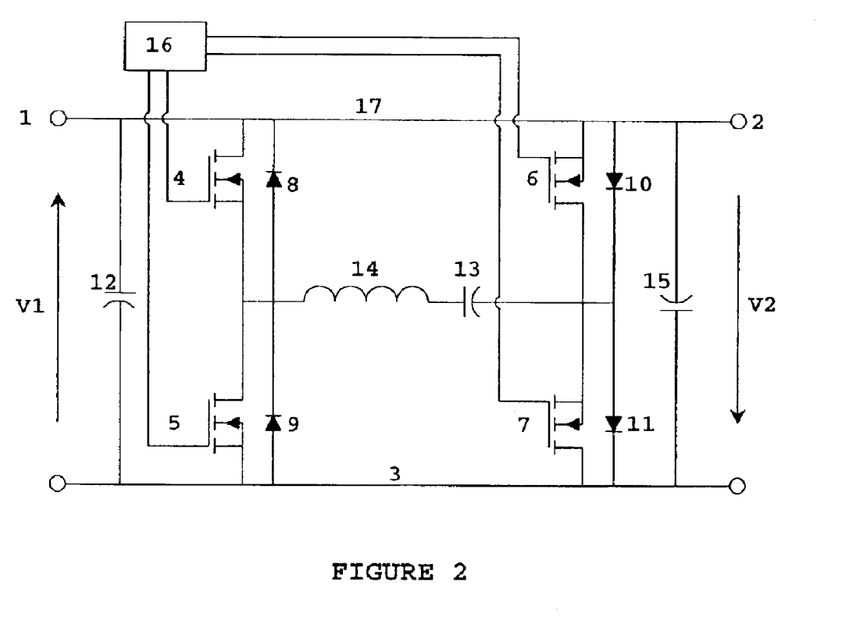
FIG. 2 is a circuit diagram for a second embodiment of a DC to DC converter according to the invention.

FIG. 2 illustrates a second embodiment of the invention. A bi-directional inverting switched-capacitor quasi-resonant converter has a first voltage side V1 between the first voltage node 1 and a common ground or negative line 3, and an inverted voltage side V2 between a second voltage node 2 and the common ground or negative line 3. The first and second voltage nodes 1, 2 are coupled by a path or line 17.

The embodiment has four MOSFET switches 4, 5, 6, 7 provided with diodes 8, 9, 10, 11 connected between their Source and Drain. The first and second MOSFETs 4, 5 are in series and connected between the first voltage node 1 and the common line 3. The third and forth MOSFETs 6, 7 are in series and connected between the common line 3 and second voltage node 2. The series resonant capacitor 13 and inductor 14 are connected across the first and third MOSFETs 4, 6.

The operation of the circuit is as follows: when MOSFET 4 is turned on, diode 11 is forward biased and a sinusoidal current flows from node 1 through MOSFET 4, switched capacitor 13, inductor 14 and diode 11 to ground 3. Capacitor 13 is charged with voltage equal to V1. After half of a cycle of sinusoidal current diode 11 is reverse biased and current flow stops. MOSFET 4 is turned off and MOSFET 5 is turned on. Diode 10 is forward biased and current flows. The switched capacitor 13 is connected to V2 but with the side that was connected to node 1 now connected to line 3. Therefore, the second voltage V2 on the right hand side of the circuit is the inverted voltage of V1. The Voltage at node 2 is minus V1 with reference to common line 3. Power flow is from side V1 to side V2.

For power flow is from side V2 to side V1, MOSFET 7 is turned on and diode 8 is forward biased and a sinusoidal current flows to charge Capacitor 13. After half of a cycle of sinusoidal current diode 8 is reverse biased and current flow stops. MOSFET 7 is turned off and MOSFET 6 is turned on. Diode 9 is then forward biased and Capacitor 13 is connected to side V1 but the switching operation changes the connected polarity of Capacitor 13 and delivers an inverted voltage to V1.

In the above circuits only one MOSFET is turned on at one time. Because the presence of the inductor 14 the current is zero at turn-on and hence zero-current turn-on is obtained. Resonance between the Inductor 14 and Capacitor 13 occurs every time any one of the MOSFETs is turned on. A diode in series of the resonance path is reversed biased when the sinusoidal resonant current crosses zero. Current flow stops because the diode is reverse biased, therefore zero-current turn-off is obtained.

The bi-directional switched-capacitor DC to DC converter can convert electric power from either high voltage to low voltage or low voltage to high voltage with bi-directional power flow. All switching devices operate under zero-current switching conditions. Switching loss and current spike problems have been ameliorated.

The converter can be used for uninterruptible power supplies, battery charging and discharging system and motor drives. Furthermore, it can be fabricated in integrated circuit chips.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. A DC to DC converter including:
    a switch,
    a diode,
    an inductor,
    a capacitor connected in series with the inductor, the capacitor and the inductor connected in series having a resonant time period and being connected in series with the switch and the diode, and
    a control circuit for providing on/off signals to the switch and having a switching time period shorter than the resonant time period and longer than one-half the resonant time period.

2. A DC to DC converter including:
    a first positive node having a first voltage,
    a second positive voltage node having a second voltage, a common node, a first switch and a second switch, the first switch being connected in series with the second switch, the first and second switches connected in series being connected between the first positive node and the common node, a third switch and a fourth switch, the third switch being connected in series with the fourth switch, the third and fourth switches connected in series connecting the first positive node to the second positive node, respective diodes connected across the first, second, third, and fourth switches, an inductor, a capacitor connected in series with the inductor, the capacitor and the inductor connected in series having a resonant time period and being connected across the first and third switches, and a control circuit for providing on/off signals to the first, second, third, and fourth switches and having a switching time period longer than one-half the resonant time period.

3. The converter of claim 2 including a first filter capacitor connected between the first positive node and the common node, and a second filter capacitor connected between the second positive node and the common node.

4. The converter of claim 2 wherein the inductor is a coil with an air core.

5. The converter of claim 2 wherein the second voltage is substantially double the first voltage.

6. The converter of claim 2 wherein the control circuit provides the on/off signals only to the first switch and the second switch to produce current flow from the first positive node to the second positive node, and provides the on/off signals only to the third switch and the fourth switch to produce current flow from the second positive node to the first positive node.

7. The converter of claim 2 wherein the respective diodes are integral with the first, second, third, and fourth switches.

8. The converter of claim 2 wherein the first, second, third, and fourth switches are power semiconductor switches.

9. The converter of claim 2 wherein the first, second, third, and fourth switches are selected from the group consisting of metal oxide semiconductor field effect transistors and insulated gate bipolar transistors.

10. A DC to DC converter including:

a first positive node, a second positive node, a common node, a first filter capacitor connected between the first positive node and the common node, a second filter capacitor connected between the second positive node and the common node, first, second, third, and fourth switches including respective diodes connected across terminals of the corresponding first, second, third, and fourth switches, the first and second switches being connected in series between the first positive node and the common node, the third and fourth switches being connected in series between the first positive voltage node and the second positive node, an inductor, and a capacitor connected in series with the inductor, the capacitor and indicator connected in series being connected across the first and third switches.

11. A DC to DC converter including:

a first node, a second node, a first switch and a second switch, the first switch being connected in series with the second switch, the first and second switches connected in series being connected between the first node and the second node, a third switch and a fourth switch, the third switch being connected in series with the fourth switch, the third and fourth switches connected in series connecting the first node to the second node, respective diodes connected across the first, second, third, and fourth switches, energy storage means connected across the first and third switches, means for providing operating signals to the first and second switches for producing an output voltage across the first and second nodes at the third and fourth switches and having a first polarity, in response to an input voltage applied across the first and second nodes at the first and second switches and having a second polarity, opposite the first polarity, and providing operating signals to the third and fourth switches for in producing an output voltage across the first and second nodes at the first and second switches and having the second polarity, in response to an input voltage applied across the first and second nodes at the third and fourth switches and having the first polarity.

12. A DC to DC converter including:

a first node, a second node, a first switch and a second switch, the first switch being connected in series with the second switch, the first and second switches connected in series being connected between the first and second nodes, a third switch and a fourth switch, the third switch being connected in series with the fourth switch, the third and fourth switches connected in series being connected between the first and second nodes, respective diodes connected across the first, second, third, and fourth switches, an inductor, a capacitor connected in series with the inductor, the capacitor and inductor connected in series having a resonant time period and being connected across the second and fourth switches, and a controller for providing on and off signals to the first, second, third, and fourth switches and having a switching time period shorter than the resonant time period and longer than one-half the resonant time period.

13. The converter of claim 2 wherein the control circuit provides on/off signals to the first, second, third, and fourth switches, the on/off signals having a switching time period shorter than the resonant time period.

14. The converter of claim 11 wherein the diodes connected across the first and second switches are connected in series, in the same direction, and with a first diode polarity, across the first and second nodes, and the diodes connected across the third and fourth switches are connected in series, in the same direction, and with a second diode polarity, opposite the first diode polarity, across the first and second nodes.

15. The converter of claim 12 wherein the diodes connected across the first and second switches are connected in series, in the same direction, and with a first diode polarity, across the first and second nodes, and the diodes connected across the third and fourth switches are connected in series, in the same direction, and with a second diode polarity, opposite the first diode polarity, across the first and second nodes.

* * * * *